US012639082B2

(12) United States Patent
Bishoyi et al.

(10) Patent No.: US 12,639,082 B2
(45) Date of Patent: May 26, 2026

(54) PIPELINE PROCESSING SYSTEM AND NON-TRANSITORY COMPUTER READABLE RECORDING MEDIUM FOR RECORDING PIPELINE PROCESSING PROGRAM

(71) Applicant: AWL, Inc., Tokyo (JP)

(72) Inventors: Alok Kumar Bishoyi, Karnataka (IN); Eduardo Narvaez, Tokyo (JP); Arief Darmawan, Urayasu (JP); Yasuhiro Tsuchida, Tokyo (JP); Kishor Rabinandan, Tokyo (JP); Fadoua Ghourabi, Tokyo (JP)

(73) Assignee: AWL, Inc., Tokyo (JP)

( * ) Notice: Subject to any disclaimer, the term of this patent is extended or adjusted under 35 U.S.C. 154(b) by 76 days.

(21) Appl. No.: 18/400,009

(22) Filed: Dec. 29, 2023

(65) Prior Publication Data

US 2024/0220280 A1 Jul. 4, 2024

(30) Foreign Application Priority Data

Dec. 29, 2022 (JP) ................................. 2022-212807

(51) Int. Cl.
*G06F 9/44* (2018.01)
*G06F 9/445* (2018.01)
(52) U.S. Cl.
CPC ................................. G06F 9/44505 (2013.01)
(58) Field of Classification Search
CPC .................. G06F 1/32; G06F 9/44; G06F 1/12
See application file for complete search history.

(56) References Cited

U.S. PATENT DOCUMENTS

2019/0268401 A1* 8/2019 Desai .................. H04L 41/0803
2021/0083671 A1* 3/2021 Allory .............. H03K 19/17728
2022/0172027 A1* 6/2022 Nishimura ........... G06N 3/0464

FOREIGN PATENT DOCUMENTS

JP 2022-172625 A 11/2022

* cited by examiner

*Primary Examiner* — Keshab R Pandey
(74) *Attorney, Agent, or Firm* — Oblon, McClelland, Maier & Neustadt, L.L.P.

(57) ABSTRACT

A pipeline processing system which processes a pipeline connecting multiple blocks that are executable programs with ability to load a trained neural network model for inference processing comprises: a block file storage circuitry configured to store each block file configuring the pipeline; a configuration information storage circuitry configured to store pipeline configuration information which is information that defines the pipeline configuration and includes information about all blocks that make up the pipeline and information about the execution order of each block that makes up the pipeline; and a pipeline processing control circuitry configured to load and execute each of the blocks included in the pipeline using data input from programs outside the pipeline according to the pipeline configuration information, and return the execution results of the pipeline processing to the external programs.

6 Claims, 15 Drawing Sheets

FIG. 4
Creation of blocks
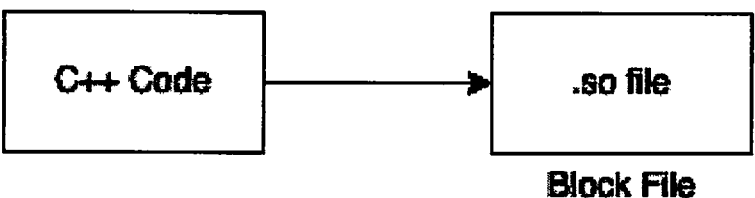
C++ Code → .so file
Block File
Usage of blocks
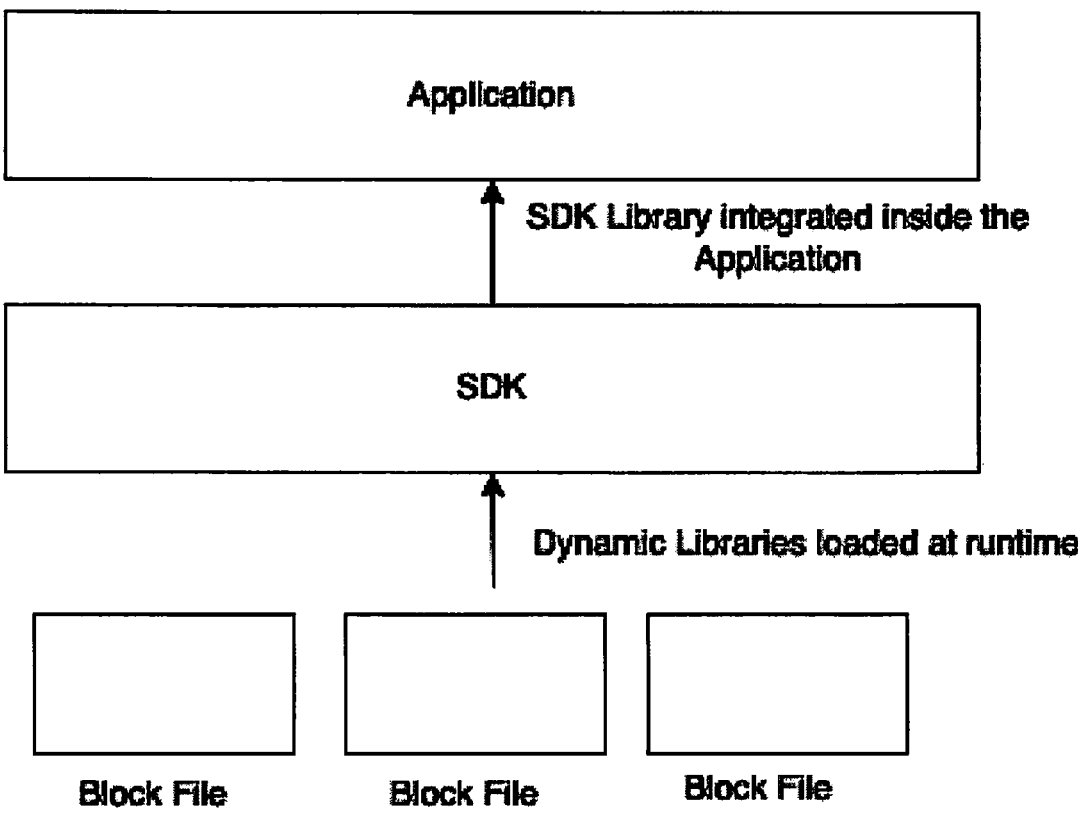
Application
SDK Library integrated inside the Application
SDK
Dynamic Libraries loaded at runtime
Block File　　　　Block File　　　　Block File

WEB PAGE

Create a new pipeline

| PIPELINE NAME | VERSION | CUSTOMER | DESCRIPTION | |
|---|---|---|---|---|
| PIPELINE A | 1 | CUSTOMER A | DESCRIPTION A | Update |
| PIPELINE B | 1 | CUSTOMER B | DESCRIPTION B | Update |
| PIPELINE C | 1 | CUSTOMER C | DESCRIPTION C | Update |
| PIPELINE D | 1 | CUSTOMER D | DESCRIPTION D | Update |
| PIPELINE E | 1 | CUSTOMER E | DESCRIPTION E | Update |
| PIPELINE F | 1 | CUSTOMER F | DESCRIPTION F | Update |
| PIPELINE G | 1 | CUSTOMER G | DESCRIPTION G | Update |

PIPELINE PROCESSING SYSTEM AND NON-TRANSITORY COMPUTER READABLE RECORDING MEDIUM FOR RECORDING PIPELINE PROCESSING PROGRAM

BACKGROUND OF THE INVENTION

Technological Field

The present invention relates to a pipeline processing system and a non-transitory computer readable recording medium for recording a pipeline processing program.

Description of the Related Art

Japanese published unexamined application No. 2022-172625 discloses an information processing device that performs processing by combining multiple machine learning models. This information processing device includes a reception unit that accepts user operations, a setting unit that configures combinations of multiple machine learning models with different output formats based on the operations accepted by the reception unit, and an execution unit that causes the plurality of machine learning models to execute detection processing based on the combinations obtained.

In recent years, computer languages that allow programming to be performed by visually displaying multiple types of program parts as blocks on the screen, dragging and dropping them, and arranging the multiple blocks on the screen have become known (for example, Scratch, etc.).

SUMMARY OF THE INVENTION

The present invention aims to provide a pipeline processing system and a pipeline processing program that are easy to use and have improved maintainability.

According to one aspect, a pipeline processing system which processes a pipeline that connects multiple blocks that are executable programs with an ability to load a trained neural network model for inference processing includes: a block file storage circuitry configured to store each block file that makes up the pipeline; a configuration information storage circuitry configured to store pipeline configuration information which is the information that defines the pipeline configuration and includes information about all blocks that make up the pipeline and information about an execution order of each block that makes up the pipeline; and a pipeline processing control circuitry configured to load and execute each of the blocks included in the pipeline using the data input from the programs outside the pipeline (hereinafter referred to as the "external program"), and return execution results of the pipeline processing to the external program in accordance with the pipeline configuration information.

Preferably, the pipeline processing system includes multiple information terminals, and each of the information terminals comprises: a transmission/reception circuitry configured to send output of each block instance via a network to another information terminal that uses it as input and receive output from each block instance on another information terminal via the network as input to each block instance on own machine.

Preferably, the pipeline processing system further comprises a server, wherein the information terminal which executes the external program comprises a terminal side configuration information storage circuitry configured to store terminal side pipeline configuration information which includes at least information about blocks executed on the information terminal and information about an execution order of the blocks in the pipeline configuration information, and the server further comprises a user interface circuitry configured to edit the pipeline configuration information containing the execution terminal information, and write the terminal side pipeline configuration information of this pipeline configuration information in the terminal side configuration information storage circuitry of the information terminal.

Preferably, the pipeline processing system further comprises a server, and the server comprises a performance display circuitry configured to receive and display performance information of the processing of each block instance from each of the information terminals.

Preferably, the pipeline processing system further comprises a server, wherein the information terminal which executes the external program comprises a terminal side configuration information storage circuitry configured to store terminal side pipeline configuration information which includes at least information about blocks executed at the information terminal and information about an execution order of these block in the pipeline configuration information, and the server receives processing performance information for each instance of the block from each of the information terminals, the server automatically edits the pipeline configuration information based on the performance information, and the server writes the terminal side pipeline configuration information of this pipeline configuration information to the terminal side configuration information storage circuitry of the information terminal.

Preferably, the pipeline processing system further comprises a code library storage circuitry configured to store a source code library necessary to execute the blocks included in the pipeline in the execution environment of the external program, and the code is incorporated into the external program.

According to another aspect of the invention, in a pipeline processing system executing a pipeline processing by combining multiple blocks, the block is an electric file that can be executed by a computer that inputs and outputs data, the pipeline processing system comprises a server and a device, the server comprises a display unit configured to display a pipeline configuration by arranging a plurality of icons representing the blocks on a screen, a change unit configured to change the pipeline configuration displayed on the display unit based on input from the user, a creation unit configured to create a configuration file to indicate the pipeline configuration based on the pipeline configuration displayed on the display unit, a selection unit configured to select a device on which the configuration file is to be deployed, and a deployment unit configured to deploy the configuration file to the device selected by the selection unit, and the device comprises an acquire unit to acquire multiple blocks that constitute the pipeline indicated by the configuration file when the configuration file is deployed by the deployment unit, and an execution unit configured to execute the plurality of acquired blocks in sequence according to the configuration file.

According to another aspect of the invention, a non-transitory computer readable recording medium for recording a pipeline processing program processes a pipeline connecting multiple blocks that are executable programs with ability to load a trained neural network model for inference processing to cause an information processing equipment to store each block file that makes up the pipeline, store pipeline configuration information which is the information that defines the pipeline configuration and includes information about all blocks that make up the pipeline and information about an execution order of each block that makes up the pipeline, and load and execute the each of the blocks included in the pipeline using data input from a program outside the pipeline (hereinafter referred to as the "external program") in accordance with the pipeline configuration information, and return execution results of the pipeline processing to the external program.

Preferably, the pipeline processing program causes the information processing equipment to store a source code library which is incorporated into the external program, and which is necessary to execute the blocks included in the pipeline in the execution environment of the external program.

Effect of the Invention

The pipeline processing system according to one aspect of this invention processes a pipeline that connects multiple blocks that is an executable program with an ability to load a trained neural network model for inference processing. The pipeline processing system stores each block file that makes up the pipeline, store pipeline configuration information which is information that defines the pipeline configuration and includes information about all blocks that make up the pipeline and information about the execution order of each block that makes up the pipeline, and load and execute each of the blocks included in the pipeline, using data entered from programs outside the pipeline in accordance with pipeline configuration information to return the pipeline processing execution results to the external program. Hence, pipeline processing can be performed efficiently.

The pipeline processing system according to another aspect of this invention is a pipeline processing system which executes a pipeline processing by combining multiple blocks. A server displays the pipeline configuration by arranging multiple icons representing multiple blocks on the screen, the server changes the displayed pipeline configuration based on input from the user, the server creates a configuration file indicating the pipeline configuration based on the displayed pipeline configuration, and the server selects a device to which deploy the configuration file, and deploys the configuration file to the selected device. When the configuration file is deployed, the device acquires multiple blocks that constitute the pipeline indicated by it, and executes the acquired multiple blocks in order according to configuration file. Hence, pipelines can be created easily and efficiently, and a configuration file, which indicates the pipeline configuration, can be easily deployed.

BRIEF DESCRIPTION OF THE DRAWINGS

FIG. 4 is a diagram for explaining how to create and use blocks.

FIG. 11 is a diagram showing a window (a UI interface of a storage web service) for an AI engineer to upload a specific block or an AI model.

FIG. 12 is a diagram showing a web page screen of the configuration web service.

DETAILED DESCRIPTION OF EMBODIMENTS

First Embodiment

Figure 1:
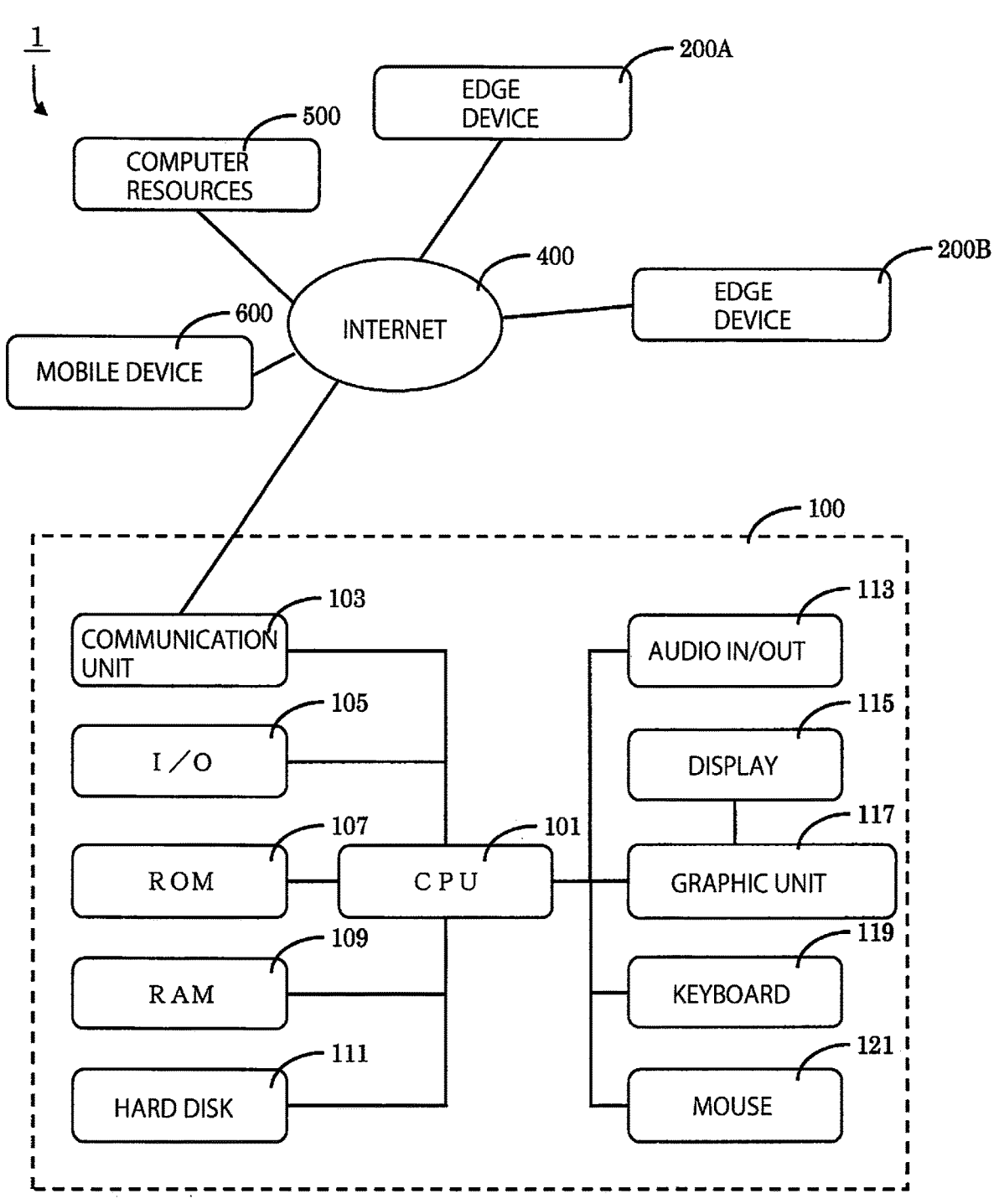
FIG. 1 is a block diagram showing a configuration of an information processing system in the first embodiment of the present invention.

FIG. 1 is a block diagram showing a configuration of an information processing system in the first embodiment of the present invention.

The information processing system 1 shown in FIG. 1 includes server computer 100 (hereinafter abbreviated as "server 100"), Internet 400, edge devices 200A and 200B, computer resources 500, and mobile device 600. This information processing system 1 is an example of a pipeline processing system which processes a pipeline connecting multiple blocks that are executable programs with ability to load a trained neural network model for inference processing. Edge devices 200A and 200B are monitoring devices with cameras, small computers including sensors and output devices, etc. The mobile device 600 is such as a smartphone, a tablet, or a notebook PC.

Server 100 includes CPU 101, communication unit 103, I/O 105, ROM 107, RAM 109, hard disk 111, audio input/output unit 113, display 115, graphic unit 117, keyboard 119, and mouse 121. The above-mentioned hard disk 111 stores a program (program to make this information processing equipment function as a "block file storage circuitry" and a "configuration information storage circuitry") that realizes the function of the server 100 of the pipeline processing program in the claims.

Server 100 is connected to the Internet 400 (or may be connected via LAN 300). Edge devices 200A, 200B, computer resource 500, and mobile device 600 are connected to the Internet 400. Any number of devices may be connected to the Internet. Some of them may not be connected.

Here, the computer resource refers to all or part of servers, personal computers, storage devices (storages in the computer, NAS (Network Attached Storage), etc.), and information communication channel (networks, load balancers, switches, routers, etc.), CPU, memory, storage device (hard disks, optical or magnetic storage devices, SSDs and other semiconductor devices), ROM, motherboards, input devices such as keyboard, mouses, microphones, displays, and output devices such as speakers, which consist them, and software such as computer programs, data, etc. that is read from a storage device and typically runs in a memory.

The computer resources 500 and server 100 may not be directly connected to the Internet 400, but may be connected via a router (not shown). By providing a firewall function to the router, computer resources 500, and server 100, access to the computer resource 500 and server 100 from the Internet 400 side is prohibited. Hence, computer resources 500 and server 100 are not operated from the outside via the Internet 400, and accessing the data stored in the computer resources 500 and server 100 from the outside is prohibited.

The communication protocol among devices is HTTPS (Hypertext Transfer Protocol Secure) or the like. That is, HTTP communication is performed using secure encryption (data encryption method using a private key and a public key) provided by SSL (Secure Sockets Layer)/TLS (Transport Layer Security) protocol, so the content of communication between computer resources 500 and server 100, etc. can be made confidential, and the content of communication can be prevented from being leaked to a third party. Encrypted communication other than HTTPS may be used as long as it is possible to prevent the communication contents from being leaked to a third party.

Figure 2:
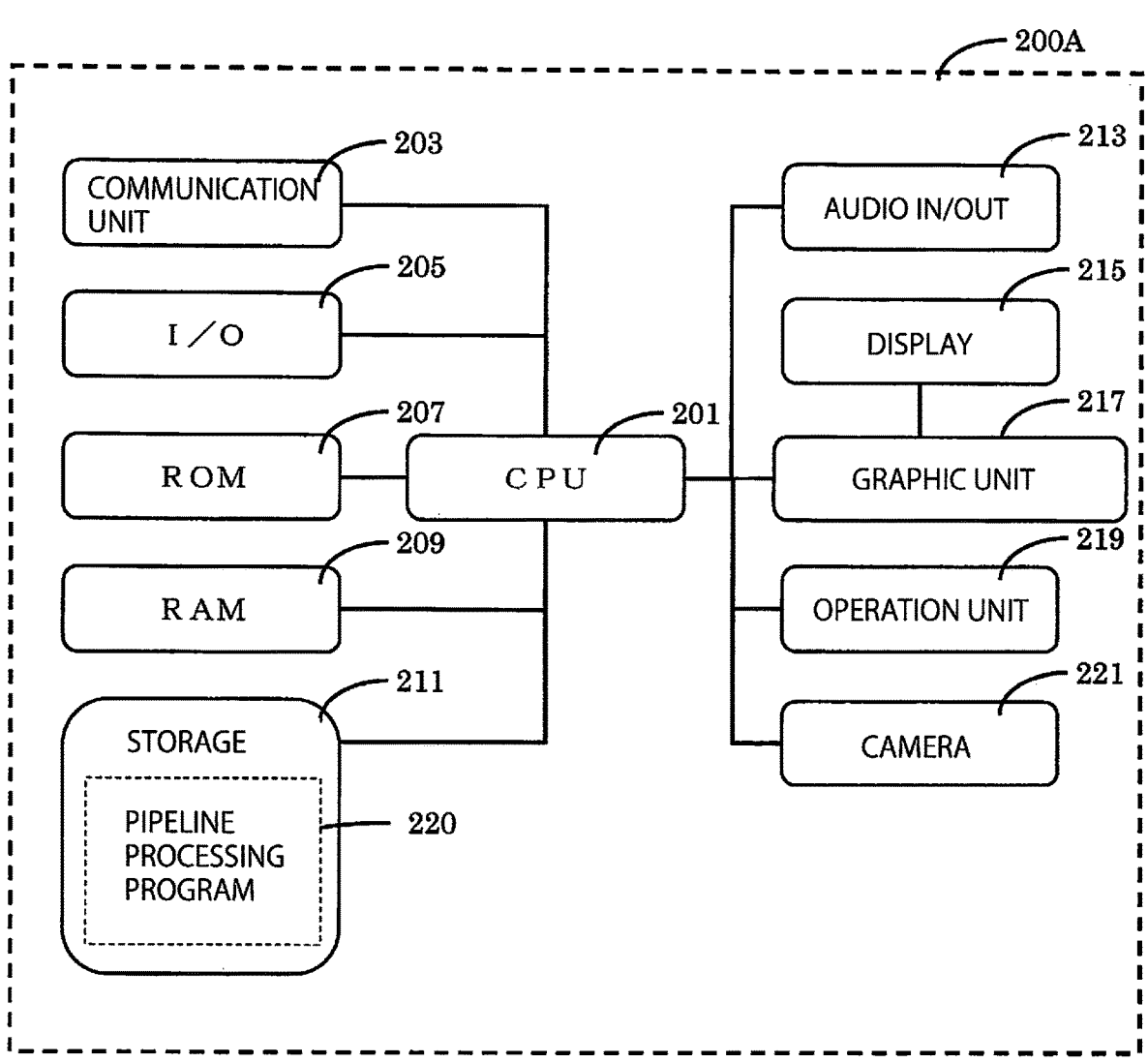
FIG. 2 is a block diagram showing a configuration of one of edge devices 200A and 200B in FIG. 1.

FIG. 2 is a block diagram showing a configuration of one of edge devices 200A and 200B in FIG. 1.

Each of edge devices 200A and 200B includes CPU 201, communication unit 203, I/O 205, ROM 207, RAM 209, storage 211 such as memory and hard disk, audio input/output unit 213, display. 215, graphic unit 217, operation unit 219, and camera 221. This is a specific example of an edge device, and an edge device may include various sensors, etc., or may not have a camera directly, but may be connected to a camera. Pipeline processing program 220 is stored in storage 211 above. This pipeline processing program 220 is a program (a program to make the information processing equipment function as a pipeline processing control circuitry) in charge of the functions of the edge devices 200A and 200B side among the pipeline processing programs in the claims.

Hard disk 111 and storage 211 contain programs recorded in computer-readable executable format that operate server 100 and edge devices 200A and 200B as information processing equipment by being executed in sequence by CPUs 101 and 201. That is, hard disk 111 and storage 211 are "Non-transitory computer readable recording media for recording a pipeline processing program" in the claims. The programs are read from hard disk 111 and storage 211 and expanded onto RAMs 109 and 209. The programs are executed by CPUs 101 and 201 on RAMs 109 and 209.

Server 100, edge devices 200A, 200B, computer resources 500, and mobile device 600 are information terminals (devices), and by executing the blocks described later, they operate (perform data processing) according to the pipeline configuration.

Figure 3:
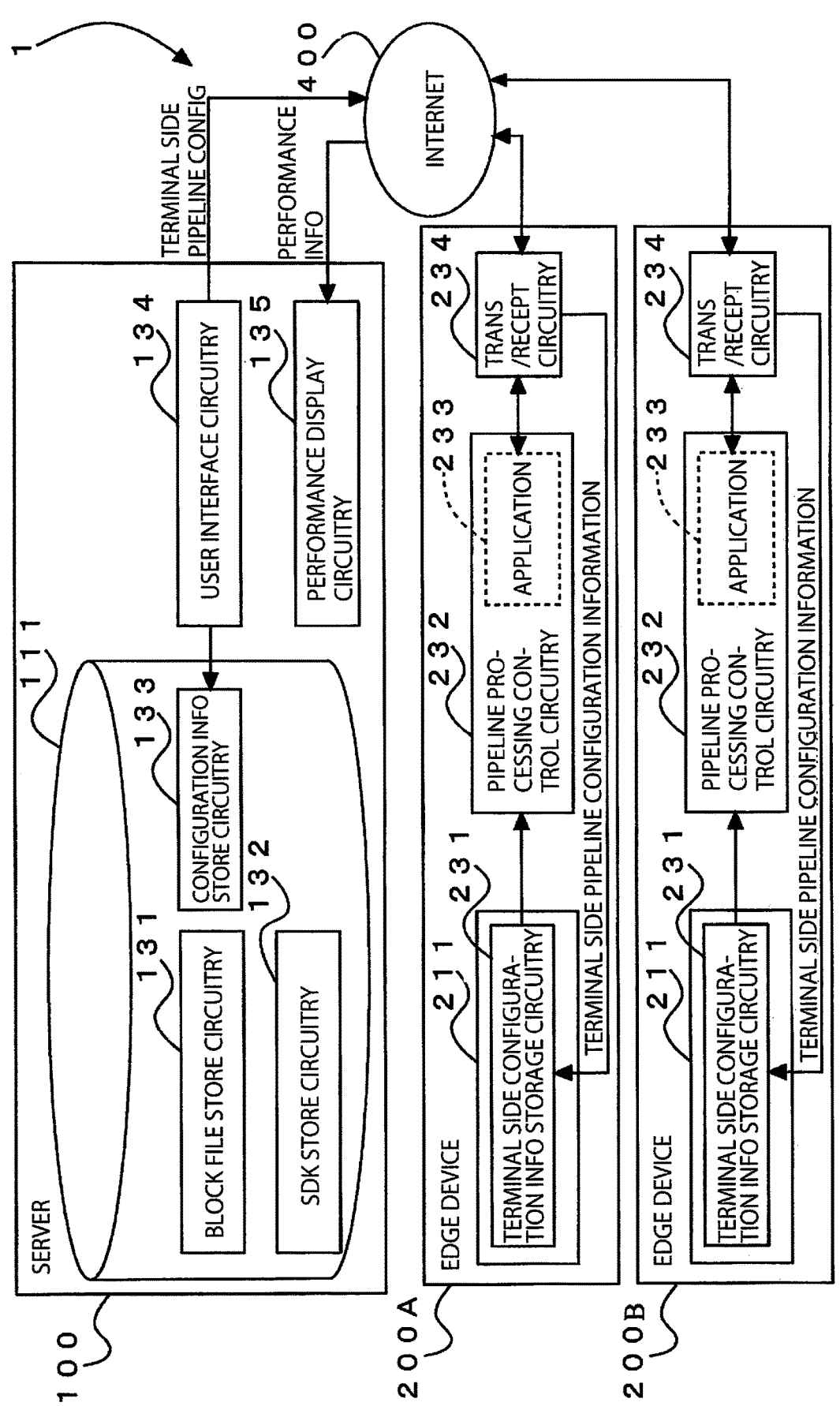
FIG. 3 is a diagram showing functional blocks of the server 100 and edge devices 200A and 200B that play the main roles in the above information processing system 1.

FIG. 3 shows the functional blocks of server 100 and edge devices 200A, 200B, which play a major role in information processing system 1 above (Note: Unlike the "blocks" recited in the claims, it means "functional blocks" in ordinary information processing equipment including microcomputers). Server 100 includes block file storage circuitry 131, SDK storage circuitry 132, configuration information storage circuitry 133, user interface circuitry 134, and performance display circuitry 135 as functional blocks. The above SDK storage circuitry 132 corresponds to the code library storage circuitry. Furthermore, the above block file storage circuitry 131, SDK storage circuitry 132, and configuration information storage circuitry 133 are realized by hard disk 111 of server 100. User interface circuitry 134 is mainly realized by the CPU 101 of server 100, communication unit 103, display 115, graphic unit 117, keyboard 119, and mouse 121. Performance display circuitry 135 are mainly realized by the CPU 101, communication unit 103, display 115, and graphic unit 117 of server 100.

Block file storage circuitry 131 stores the files of blocks configuring the above pipeline. The SDK storage circuitry 132 is incorporated into the external program and stores an SDK (Software Development Kit), which is a library of source codes necessary to execute the blocks included in the above pipeline in the execution environment of the external programs. Configuration information storage circuitry 133 stores the above pipeline configuration information which is information that defines the pipeline configuration and includes information about all blocks that make up the pipeline and information about the execution order of each block that makes up the pipeline. User interface circuitry 134 provides functions such as a user interface for a user (a pipeline manager, described later) to edit the pipeline configuration information and write terminal side pipeline configuration information among the pipeline configuration information to terminal side configuration information storage circuitry 231 in storages 211 of edge devices 200A and 200B. Performance display circuitry 135 receives and displays performance information of the processing of each block instance from each of edge devices 200A and 200B.

Edge devices 200A and 200B both include terminal side configuration information storage circuitry 231, pipeline processing control circuitry 232, and transmission/reception circuitry 234 as functional blocks. The above terminal side configuration information storage circuitry 231 is realized by storage 211 of edge devices 200A and 200B. The pipeline processing control circuitry 232 are mainly realized by the CPU 201 of edge devices 200A and 200B and pipeline processing program 220 (see FIG. 2). The transmission/reception circuitry 234 is mainly realized by communication unit 203 in FIG. 2. Note that application 233 in FIG. 3 corresponds to the "external program" in the claims.

Terminal side configuration information storage circuitry 231 stores terminal side pipeline configuration information containing information about at least blocks executed by the edge device and information about the order of execution of the blocks in the pipeline (entire) configuration information edited by the user (the pipeline manager) using user interface circuitry 134. According to the terminal side pipeline configuration information (or configuration information of the entire pipeline edited with using user interface circuitry 134), pipeline processing control circuitry 232 loads and executes each of blocks included in the pipeline (blocks to be executed by the edge device) using the data input from application 233 which is a program outside the pipeline, and returns the execution results of this pipeline processing to the application 233. Using the transmission/reception circuitry 234 above, each of edge devices 200A and 200B can send output of each block instance executed on own machine via network (Internet 400) to another edge device that uses it as input, and can receive the output from each block instance in another edge device as input to each block instance on own machine via the network. The transmission/reception circuitry 234 is also used for the process of transmitting performance information of the processing of each block instance on the own machine to the server side, and the process of receiving the terminal side pipeline configuration information sent from the server side.

Next, the present invention will be explained according to the following items.

(1) System configuration
        (1-0) Terms (Definitions)
        (1-1) SDK components
        (1-2) Block (1-2-1) How a block is created and used
(1-2-2) Single block execution
(1-2-3) Block specifications and access inside the SDK
(1-2-4) Block execution dependency decision
(2) Multi device distributed computing framework
(3) Selector+trainer mechanism
  Approach
  Selector implementation in the SDK
  Flow
(4) Interface designs
  (4-0) Overall system
  Storage Web Service
  (4-0-1) Upload AI blocks and model files
  Configuring, deploying, and monitoring web services
  (4-1-0) View deployed pipelines
  (4-1-1) Create new pipeline from the web interface
  (4-1-2) Deploy pipelines to interface
  (4-1-3) Debug pipelines and get metrics (rating scale)
(1) System configuration (1-0) Terms (Definitions)

The terms used in this specification will be explained below. These terms are used to describe examples of an embodiment of the invention, and the scope of the invention is not limited thereto.

A "model file" is a file containing parameters and definitions of instructions trained to output specific data in response to specific input data. Training is the process of optimizing parameters of a model using a series of datasets (combinations of input data and output data (labels)). A trained model can perform inference on input data that is different from the training dataset.

A "block" is pre-compiled code instructions that are loaded at runtime. In most cases, each block receives a given input and block parameters, and performs an operation on the input based on the code instructions and the block parameters. Each block can also load one or more AI model files by loading model files as a part of the execution step. Multiple blocks are collectively executed in a desired sequential manner to form a pipeline.

A "block parameter" refers to values/variables or parameters provided to the block at runtime that affect the execution of the code.

An "AI block" is a block that loads one or more model file at any point in its lifecycle as a part of its code instructions. That is, an "AI block" is an executable program which has the function of loading a trained neural network model for inference processing.

A "non-AI block" is a block that does not need to load a model file at any point in its life cycle as a part of its code instructions.

A "pipeline" is a series of computational steps that need to be performed for a desired business use case, and each step in the pipeline is represented by a block. Note that this "pipeline" corresponds to a "pipe" or "pipeline" in Unix operating systems.

A "pipeline configuration file" is a configuration file that describes the following: (A) all blocks that make up the desired pipeline, (B) execution order and dependency graph of each block in the pipeline, and (C) individual block parameters and model files to be passed to each block. In other words, the "pipeline configuration file" includes the pipeline configuration information which is information that defines the pipeline configuration and includes information about all blocks that make up the pipeline and information about the execution order of each block that makes up the pipeline. This "pipeline configuration information" is created on the server 100 side based on input information using the UI, and is downloaded to the information terminals (edge devices 200A, 200B, etc.) that executes the application. A pipeline configuration file is shortened to simply a configuration file.

(1-1) SDK Components

A "SDK" is a code library and has the following characteristics. (A) To be included within software projects for any operating system and any programming language, (B) Takes in some data from an integrated external application ("external program" in the claims), performs a series of computer operations defined in a pipeline configuration file, and returns any resulting output, if it exists, to the external application, (C) Manage the allocation of memory space required to run the AI applications, and (D) Optimizes the pipeline execution rate.

An "application" ("external program" in the claims) is any software that includes an SDK (with the features defined above) as a part of the component and sends data to and receives data from the SDK.

The components of the SDK are explained below. The components include buffers, block sequence managers, I/O managers, settings managers, and framework SDK managers. Each will be explained.

A "buffer" is the main container object for storing input data and output data for the SDK processing. This is a wrapper of a FlatBuffer with features useful for data processing. The buffer is created by the application side, and filled with the necessary input data by the application side, and then this input data is passed to the SDK to be processed as a reference object. The results are stored in the same buffer, and the application side can use the same buffer object for its own handing.

A "block sequence manager" creates instances of multiple blocks that contain the main AI processing. After creating multiple block instances, they are stored in an internal array and available for use. The block sequence manager also executes the sequence of blocks using the buffer as input. This component is used as the main controller for inference execution.

An "I/O manager" contains the buffer, which is the main data container. It acts as a buffer handler for storing the current buffer instance, and also acts as a buffer handler for storing past buffer instances. The I/O manager is included in the block sequence manager and has the ability to store past buffers as described above.

A "settings manager" module has the following purposes: (1) Read and load the settings in the specified format, (2) Check for changes in settings, (3) Perform file/model decryption, and (4) Activate/deactivate SDK license.

A framework SDK in a "framework SDK manager" is a component used as an external interface. It contains all the exposed functions for interacting with the application side. The complete SDK functionality should be accessed using only the member functions of the framework SDK class.

(1-2) Block (1-2-1) how a Block is Created and Used

Each block is essentially a shared library (.so file), and its execution dependencies are the same as those of the SDK. To use them, you need to load the shared object files including the headers (containing all dependencies needed to execute the block) from the SDK libraries at runtime.

Whenever you need to add new dependencies to the SDK, you must recompile the SDK libraries and include them again in the project used by the application. Similarly, using new features for the SDK (including new dependencies) requires rebuilding and creating new version of the shared library files of each block.

The upper diagram in FIG. 4 shows that a block is created by building (compiling) a block file with .so extension from code written in C++ (or other computer language).

The lower part of FIG. 4 shows the environment in which blocks are used. A situation is shown in which one or more blocks are loaded as dynamic libraries into the SDK at runtime. A dynamic library is a library that uses dynamic linking to link with the program at runtime. The SDK libraries will be integrated inside the application.

(1-2-2) Single Block Execution

Figure 5:
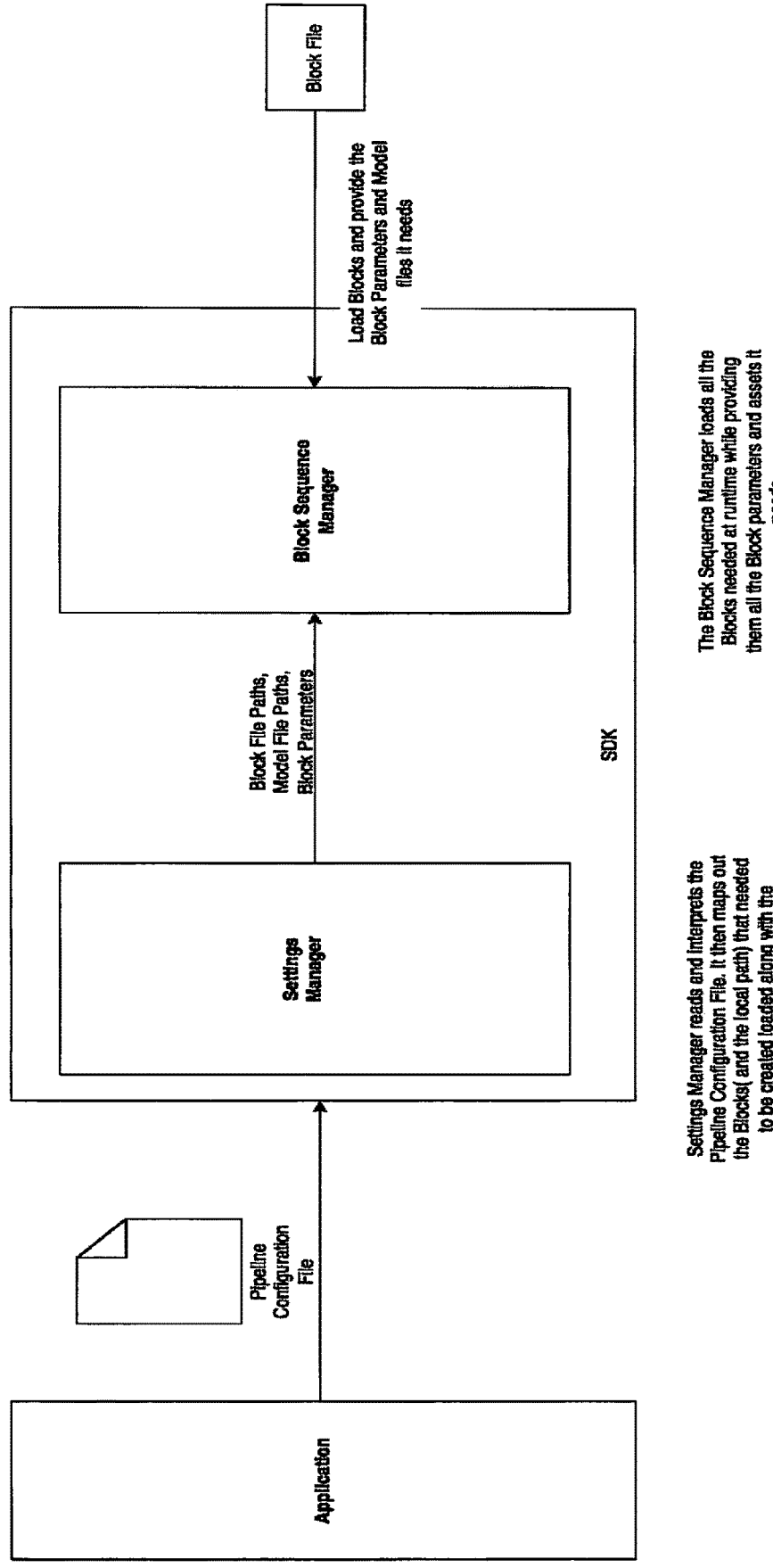
FIG. 5 is a diagram showing the pipeline configuration file sent from the application to the SDK, and the operation of the SDK based on the pipeline configuration file.

A block requires the following information when loaded at runtime:

(A) block parameters related to the block (B) model files (and other assets) required to execute the block FIG. 5 is a diagram showing the pipeline configuration file sent from the application to the SDK, and the operation of the SDK based on the pipeline configuration file.

As shown in FIG. 5, the SDK includes a settings manager and a block sequence manager. When a pipeline configuration file is sent from application to the SDK, the settings manager reads and interprets the contents. The settings manager then indicates the required blocks (and the local paths) to be generated and loaded, along with each block's parameters and assets.

The settings manager sends the block file paths, model file paths, and block parameters to the block sequence manager.

The block sequence manager loads all the blocks required at runtime and provides them with all required block parameters and assets (and model files if necessary).

(1-2-3) Block Specifications and Access in SDK

The input data to a single inference loop is defined by mentioning the namespace (a name within a range: "Within this range, different variables must have different names.") of the buffer into which the application writes the input data.

(Specification 1) Buffer Access

Each block has access to the common buffer and has the ability to write data to the buffer and read data existing in the buffer. Hence, each block can:

(A) save its output in the buffer that can be read later by other blocks (downstream blocks) executed in the same inference loop, and (B) read the output data of previously executed blocks (upstream blocks) in the same inference loop.

Figure 6:
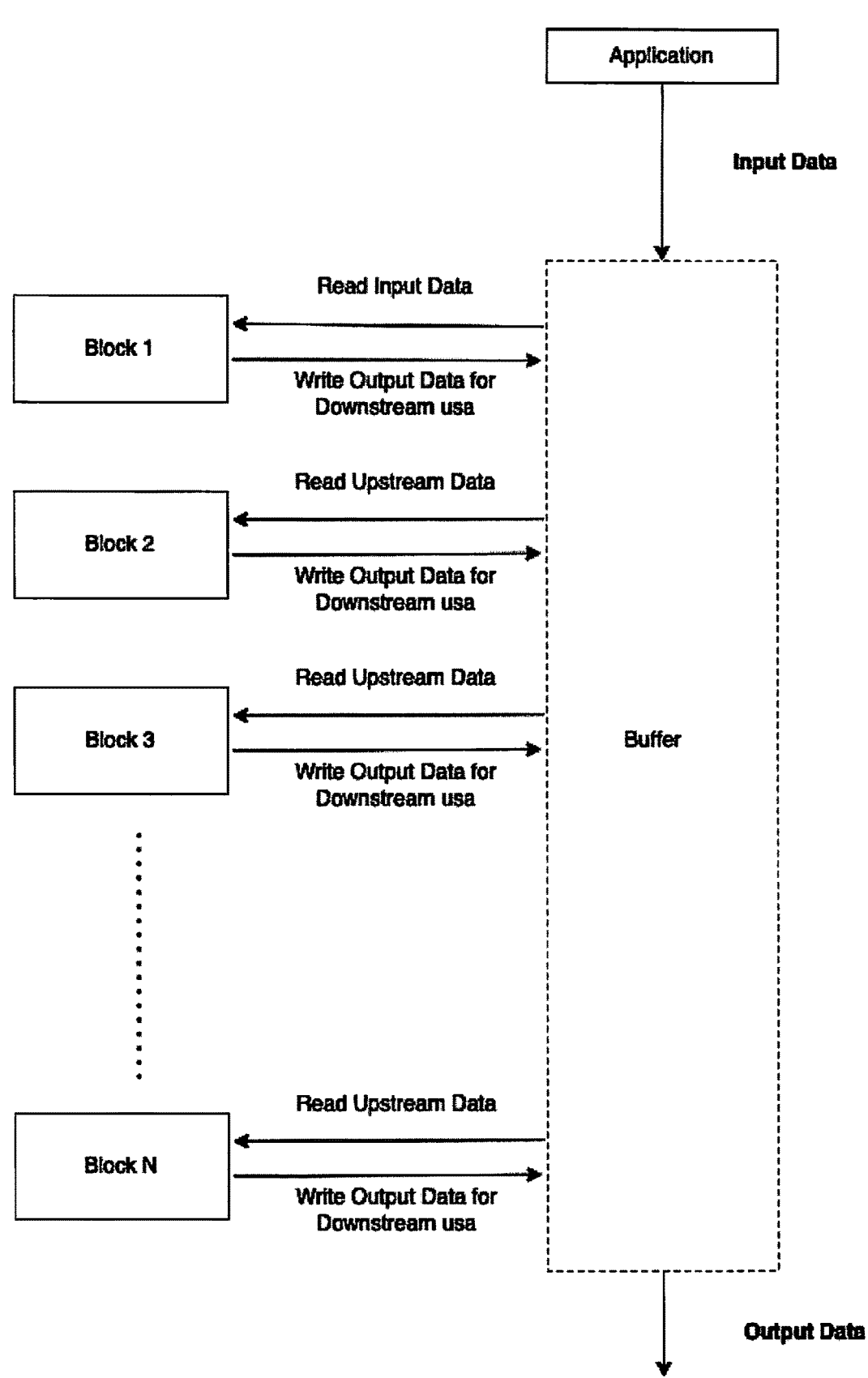
FIG. 6 is a diagram showing a state in which a plurality of blocks (block 1 to block N) operate via a buffer.

FIG. 6 is a diagram showing a state in which a plurality of blocks (block 1 to block N) operate via a buffer. The buffer inputs data from the application and stores it temporarily. Using this as a trigger (or at some other time without the triggering), the most upstream block 1 reads the data stored in the buffer, processes the data, and writes the output data to the buffer for downstream use. One block downstream, block 2, inputs the data written by block 1 which is upstream, processes the data, and writes the output data to the buffer for downstream use (further, the data entered into the buffer by the application may be used).

Similarly, processing is performed in order from the next block 3 to the most downstream block N, and when the final data is written to the buffer, it becomes the final output data.

(Specification 2) Persistent Data Container

A "block specific data" is data that is relevant in the context of execution of a particular block. This block specific data is not required for blocks other than the block to which it belongs.

Each block has a persistent data container that it can use. Each block can write block specific data to the persistent data container, read the block specific data, and delete the block specific data.

Each persistent data container is unique to each block. Data in persistent data containers persists over the lifecycle of the SDK instance unless explicitly deleted by the block logic. Data in the persistent data container persists across multiple inference loops unless explicitly deleted by the block logic.

Hence, each block stores its output, or some intermediate information, in the persistent data container that can be read later by the same block at a later point in time in a future inference loop (temporal downstream blocks), and each block can read the output data or some intermediate information of previously executed blocks in past inference loops (temporal upstream blocks).

The access mechanism for uniquely identifying data for a particular inference loop is as follows. Each inference loop has a unique request ID (RequestID) that is set by the application side when it passes the input for that inference loop. This RequestID is used to set data to and get data from the persistent data container.

Figure 7:
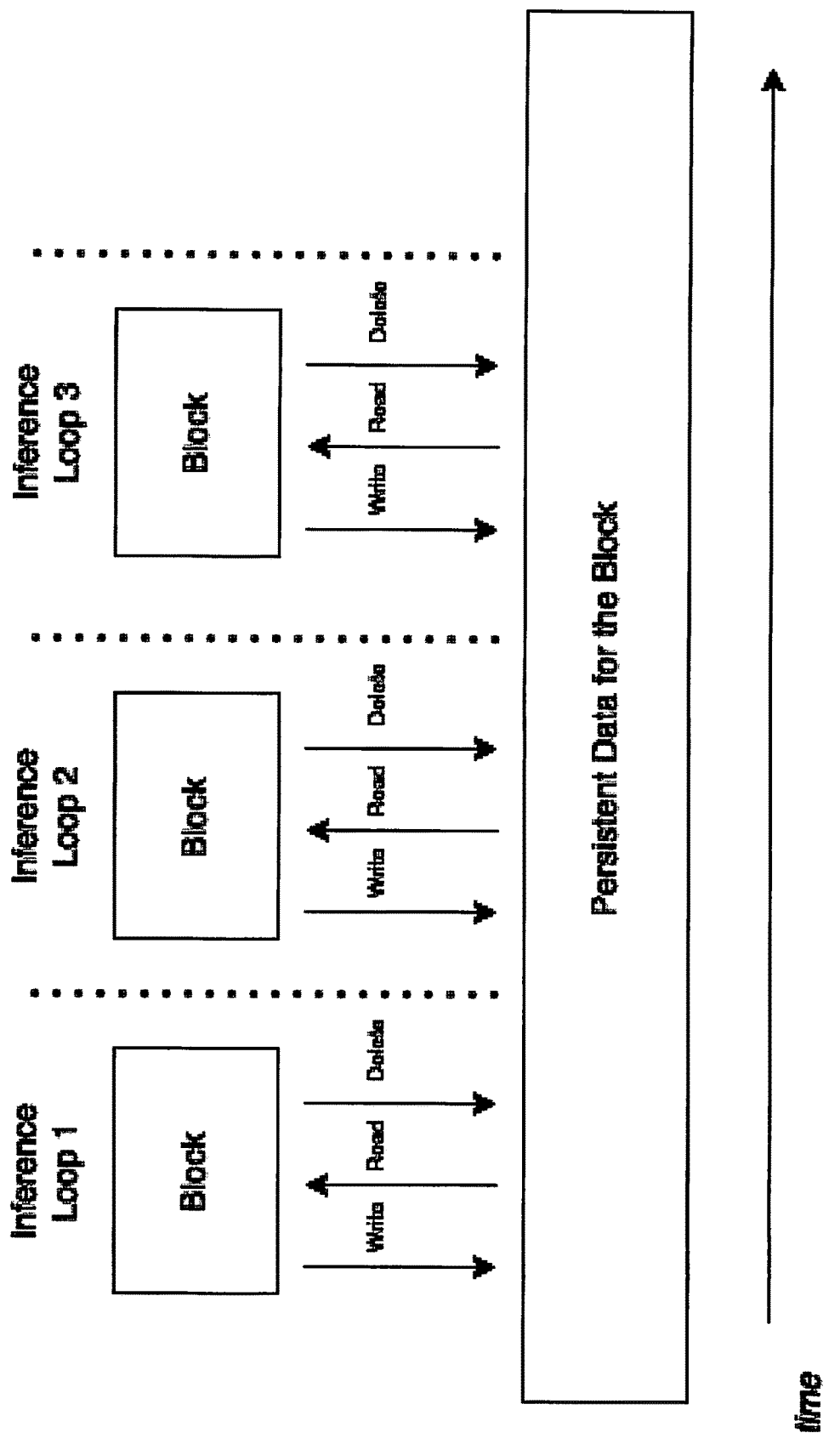
FIG. 7 is a diagram showing a state in which one block in multiple inference loops (each executed at different times) uses the persistent data container associated with the block.

FIG. 7 is a diagram showing a state in which one block in multiple inference loops (each executed at different times) uses the persistent data container associated with the block. This indicates that the loop on the right side is executed later in time. A block can write information to, read information from, and delete information from the persistent data container in each inference loop.

(1-2-4) Block Execution Dependency Decision

The pipeline configuration file contains the followings (and other information as well):

(A) List of multiple blocks defined ([block1, block2, block3, . . . ]). One block can depend on execution of other blocks if necessary.

(B) Definition of a directed acyclic graph of a block whose execution occurs only after dependent blocks have been executed.

Objectives for optimizing runtime block execution are:

(A) Executing a block on which all the dependent blocks have been executed, and (B) Each block should be spawned in separate threads, if there are multiple such blocks with all the dependent blocks have been executed.

We use a modification of Kahn's algorithm to achieve these parallel.

(2) Multi-Device Distributed Computing Framework

Multiple instances of the SDK can be executed on the same application/device. Additionally, each instance of the SDK can be executed independently of other instances.

The output of one SDK instance can be sent over the network to another device that can use it as input. The application creates each SDK instance for each block step (each block with unique input and output). In other words, a new SDK instance is created for every block step. The application (or the wrapper layer) needs to create its own SDK instance for each block step from the pipeline configuration.

Figure 8:
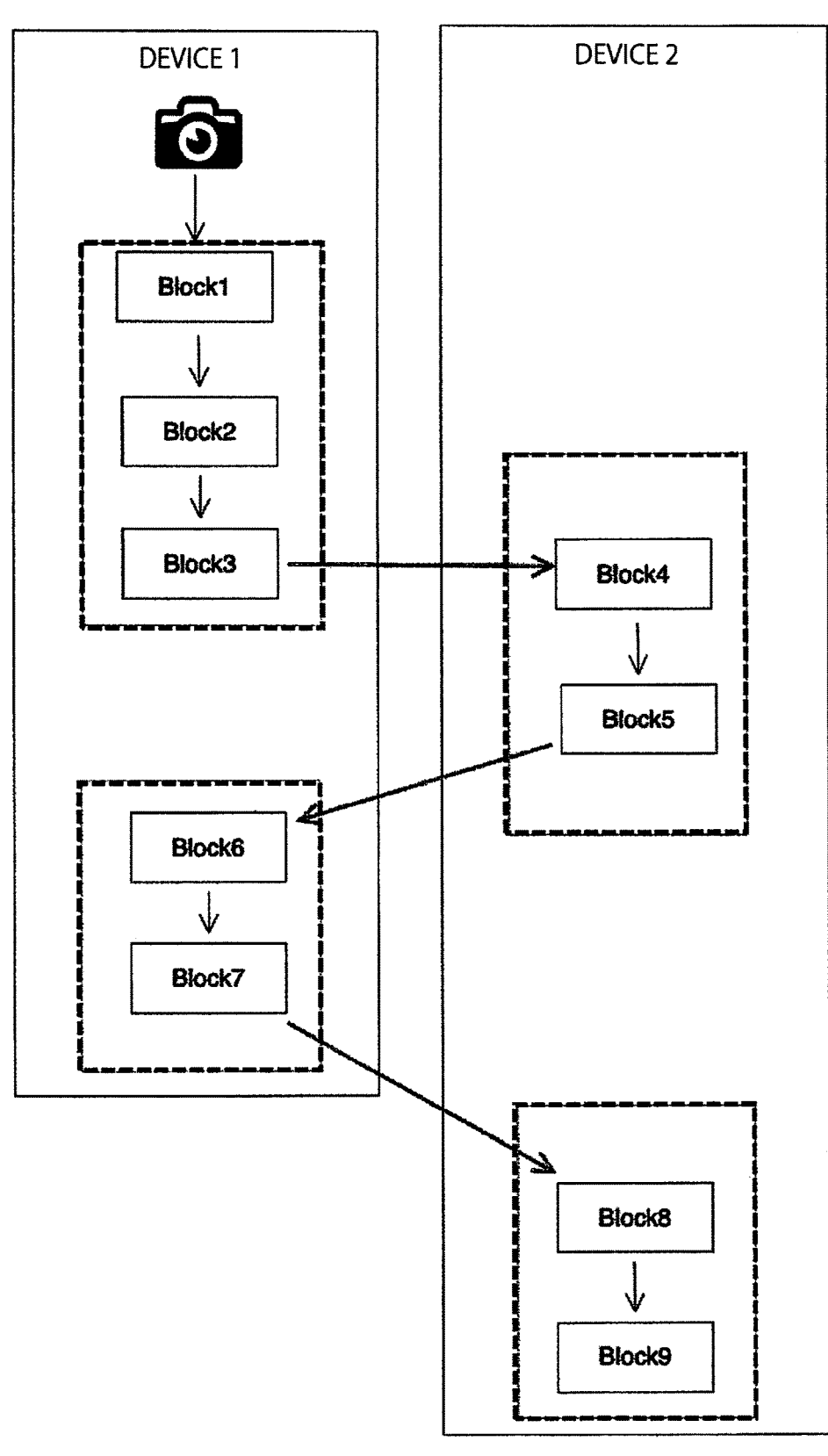
FIG. 8 is a diagram showing processing when performing distributed computing with multiple devices.

FIG. 8 is a diagram showing processing when performing distributed computing with multiple devices. Here, distributed computing is performed between device 1 and device 2.

The device 1 is, for example, a device (e.g. an edge device or an IoT device) that is equipped with a digital camera (video), processes images using a slow processing speed hardware, and outputs the images. Device 1 processes images from the camera using blocks 1 to 3 in series. Blocks 4 and 5, which require heavy processing, are executed on high-performance device 2, and the data after execution is sent from device 2 to 1. Blocks 6 and 7 are executed on device 1, and the output data is sent to device 2 again. In device 2, the execution result of block 7 is processed in blocks 8 and 9.

Transferring data between devices (and determining what data to send where) is handled by the application side.

(4) Interface Designs (4-0) Overall System

The developers and users involved in the system will be explained below.

An "AI engineer" is a person who creates AI blocks and models stored and included in the configuration file.

A "pipeline manager" is a person who takes specific customers and deployment requirements into account to stitch together blocks and configuration files, deploy the configuration file across multiple devices, and monitor the system execution.

The components of the system will be explained below.

An "assets container" is a place in the cloud where raw (unedited and original) assets (AI blocks and models) are stored.

An "assets database" is a database that stores information about the inventory of assets and related information for each asset, so that assets (AI blocks and models) can be retrieved quickly.

A "storage web service" is a web service that assists AI engineers to place assets into the appropriate assets containers and store the appropriate associated information and tags for each AI asset so that each asset can be searched and retrieved later.

A "configuration, deployment, and monitoring web service" is a web services that assists pipeline managers to create pipelines.

Figure 9:
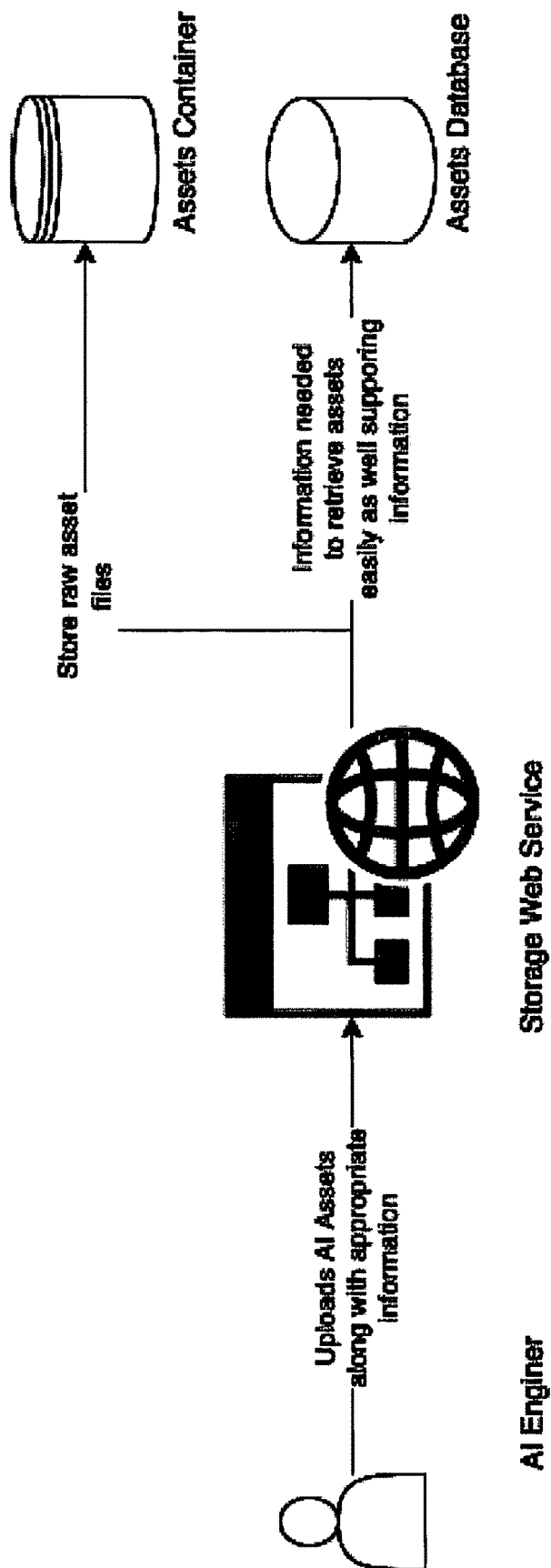
FIG. 9 is a diagram for explaining a storage Web service.

FIG. 9 is a diagram for explaining a storage web service.

As shown in FIG. 9, an AI engineer uploads an AI asset along with the necessary information to the storage web service. The storage web service stores raw (unedited and original) asset files in the assets container. Additionally, the assets database stores information that enables quick retrieval of assets, along with supporting information.

Figure 10:
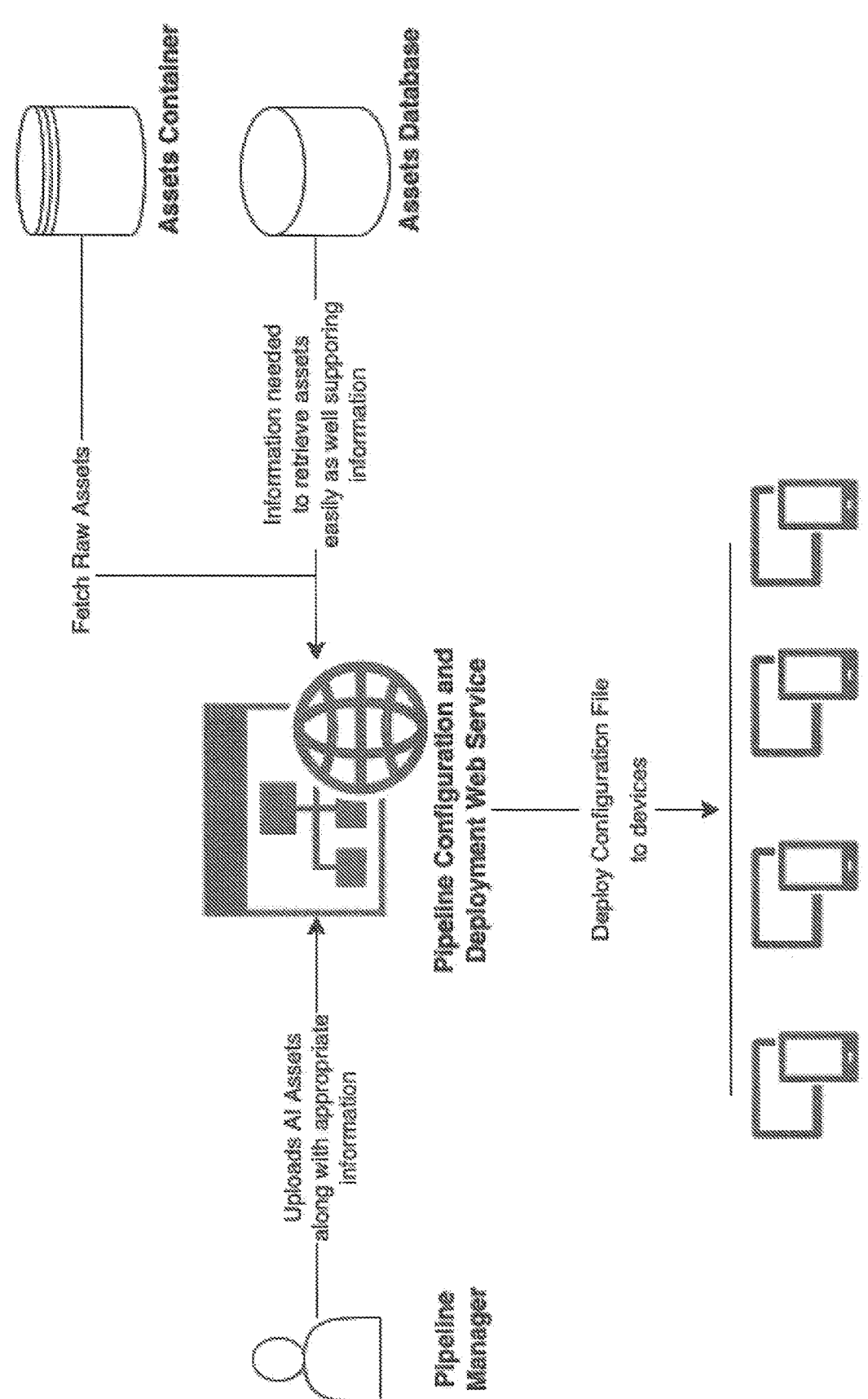
FIG. 10 is a diagram for explaining a configuration, deployment, and monitoring Web service.

FIG. 10 is a diagram for explaining configuration, deployment, and monitoring web services.

As shown in FIG. 10, a pipeline manager accesses "(Pipeline) Configuration, deployment, and monitoring web services" and performs operations, to retrieve information from the assets database that allows to quickly retrieve assets, along with supporting information. Also, the pipeline manager gets the necessary raw assets from the assets container. The pipeline manager deploys the necessary configuration files for one or more devices via "Configuration, deployment, and monitoring web services". In this way, configuration files are created and deployed to each device.

Next, the storage web service will be explained.

(4-0-1) Uploading AI Blocks and Model Files

Once an AI engineer builds specific blocks or AI models, they are stored in a central storage web service that is accessible to internal employees. The uploaded assets are stored in a storage container with appropriate related information and tags for later search and retrieval.

Figure 11:
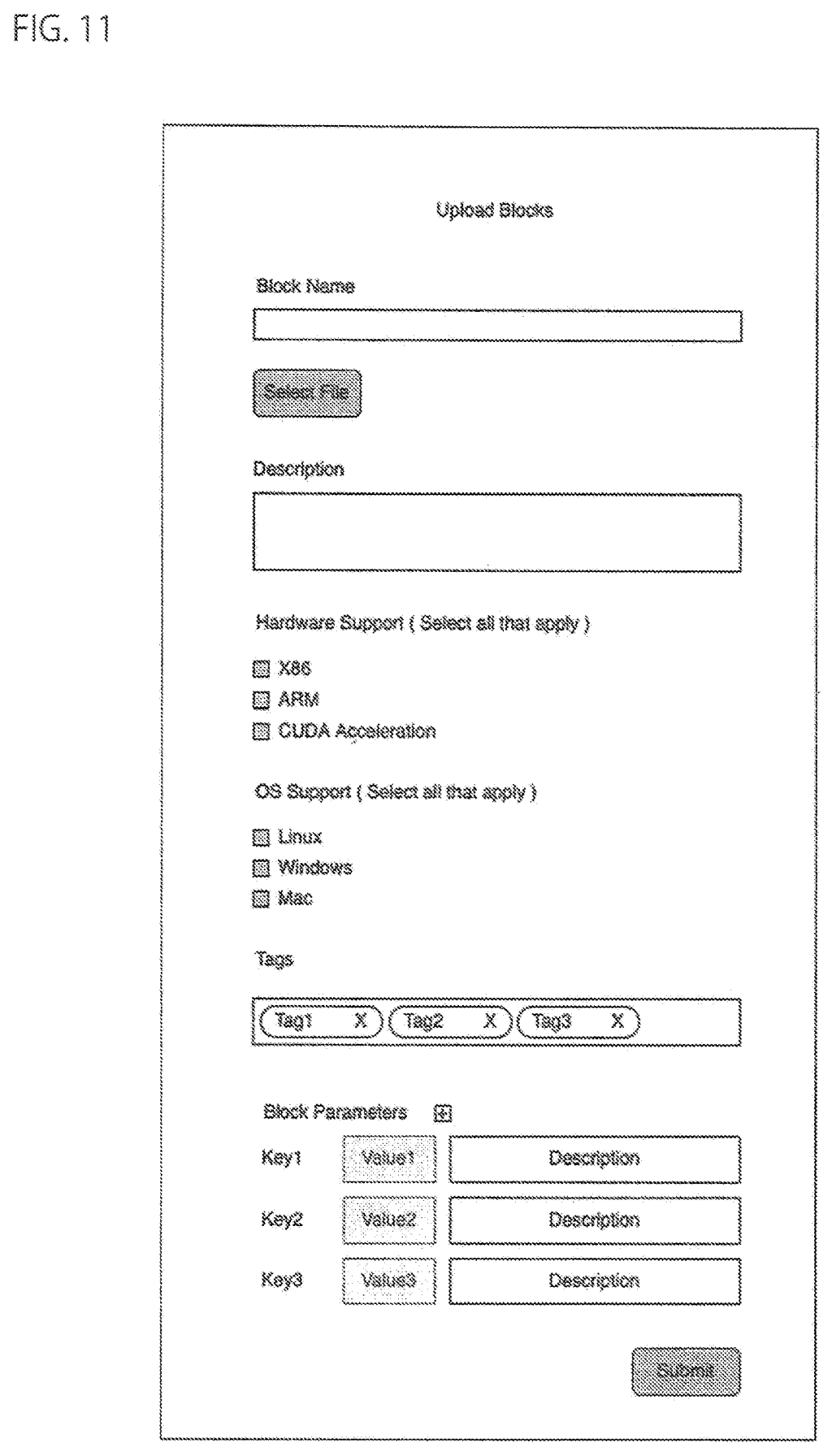

FIG. 11 is a diagram showing a window (a UI interface of a storage web service) for an AI engineer to upload a specific block or an AI model.

From the top of the diagram, an input field for a block name given by the AI engineer, a button for selecting files to upload (Select File), a field to enter the block description, checkboxes to select the compatible hardware (Hardware Support), checkboxes to select the supporting OS (OS Support), input fields for tags to be added to the block, input fields for block parameters (Block Parameters), and an upload (Submit) button are displayed.

The field to enter the block description is a field where you can enter a description of the block so that the pipeline manager can make the correct decision when creating a configuration file.

The checkboxes to select compatible hardware are where you check the compatible hardware and compatible CPUs for the block. For example, hardware such as X86, ARM, or CUDA accelerators are selectable.

The checkboxes for selecting compatible OS are a place to select compatible OS for the block. For example, OS such as Linux, Windows, and Mac can be selected.

The input field of the tag added to the block is to select customer tags to be added so that the user can quickly access the block later.

The block parameter input field is to enter parameters required for the block, initial values, and descriptions of each parameter.

Next, the "Configuration, deployment, and monitoring web service" will be explained. The "Configuration, deployment, and monitoring web service" (configuration web service) has the following functions and screens.

(4-1-0) View Deployed Pipelines

The configuration web service page allows the pipeline manager to view all deployed pipelines, as well as create and deploy new pipelines.

FIG. 12 is a diagram showing a web page screen of the configuration web service.

All deployed pipelines are listed as shown here. For each pipeline, its name, version, customer, description, and an update button for the pipeline are displayed. You can also create and add new pipelines by pressing the button at the top right of the screen.

(4-1-1) Create New Pipelines from the Web Interface

Figure 13:
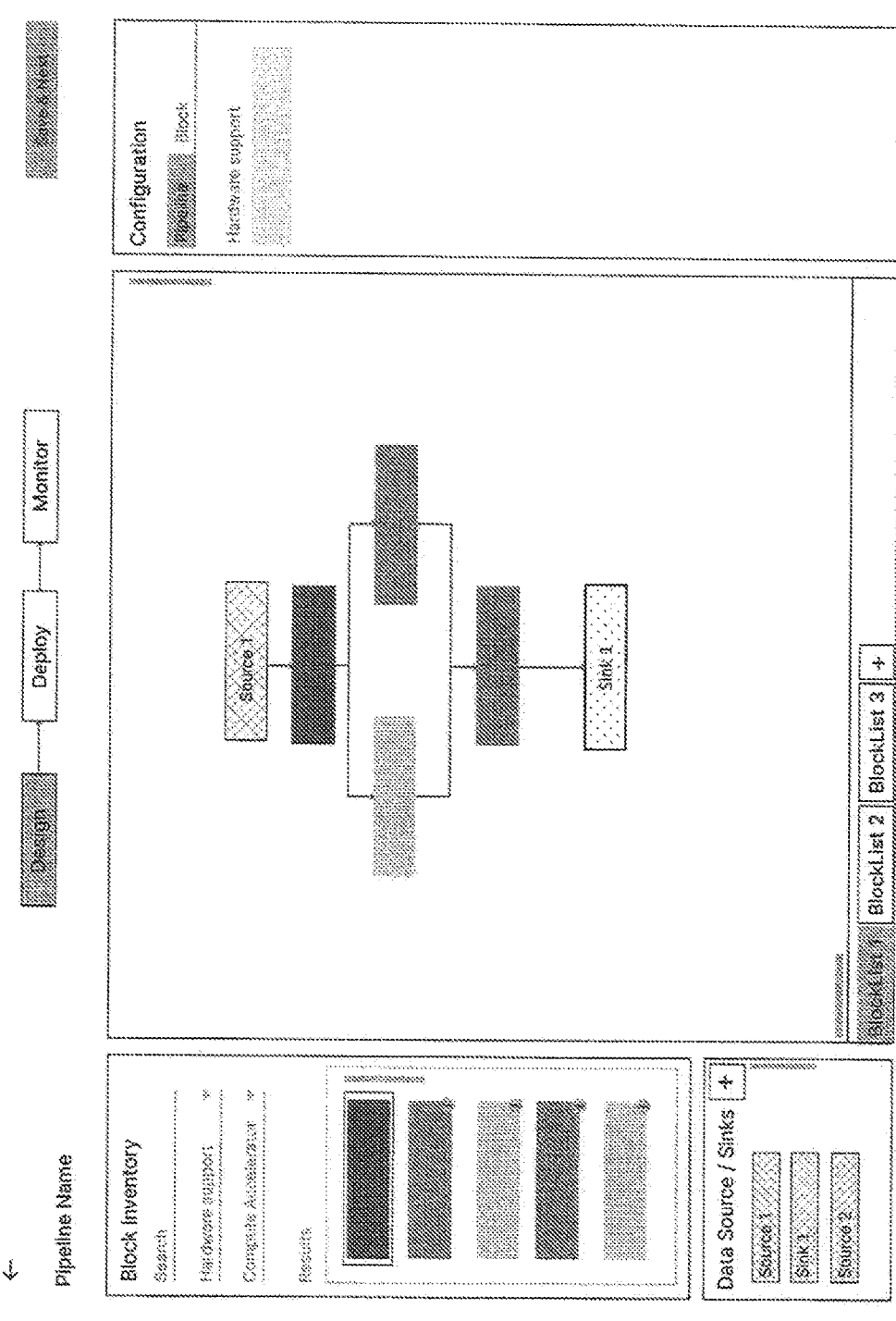
FIG. 13 is a diagram showing a screen for creating a new pipeline via the web interface.

FIG. 13 is a diagram showing a screen for creating a new pipeline via the web interface.

This screen is displayed by pressing the button (FIG. 12) at the top right of the web page of the configuration web service. The screen in FIG. 13 is a UI for creating a configuration file. On this screen, a pipeline manager can configure a pipeline by arranging icons representing multiple blocks on the screen.

The pipeline name is displayed at the top left of the screen and can be changed. The "Block Inventory" part displayed the below is the part for searching blocks based on the information stored in the assets container. Here, blocks that match the conditions will be displayed after the search (filtering) using compatible hardware, calculation accelerators, etc. as keys. By selecting a displayed block, its description will be displayed. Displayed blocks can be dragged and dropped into the central pipeline diagram builder.

"Data Source/Sinks" displayed at the bottom left of the screen is a part that defines the input/output type for each block list (collection of blocks) that makes up the pipeline. Source 1 and Source 2 shown in this column are data source (input) blocks, and Sink 1 is a block that receives data. A data source can be data input from programs outside the pipeline (external application).

The center of the screen shows a pipeline diagram builder that allows to draw a pipeline diagram using drag and drop and create a pipeline corresponding to that diagram.

The toggles to select which of the various block lists for a particular configuration are displayed in the builder is displayed at the bottom center of the screen. Here, one of BlockList1, BlockList2, and BlockList3 can be selected, and the state in which BlockList1 is selected is shown.

One block list consists of a single block or a combination of multiple blocks, and it is possible to create a pipeline (configuration) containing multiple block lists. Of course, only one block list may exist in one pipeline.

"Configuration" on the right side of the screen is the part for setting block parameters of the selected block and parameters at the pipeline level.

Using this screen, a pipeline manager combines block created by AI engineers, sets input and output, and configures the pipeline.

(4-1-2) Deploy Pipelines to Interface

Once a pipeline is defined, the next step is to decide where each block list of the pipeline is deployed.

Figure 14:
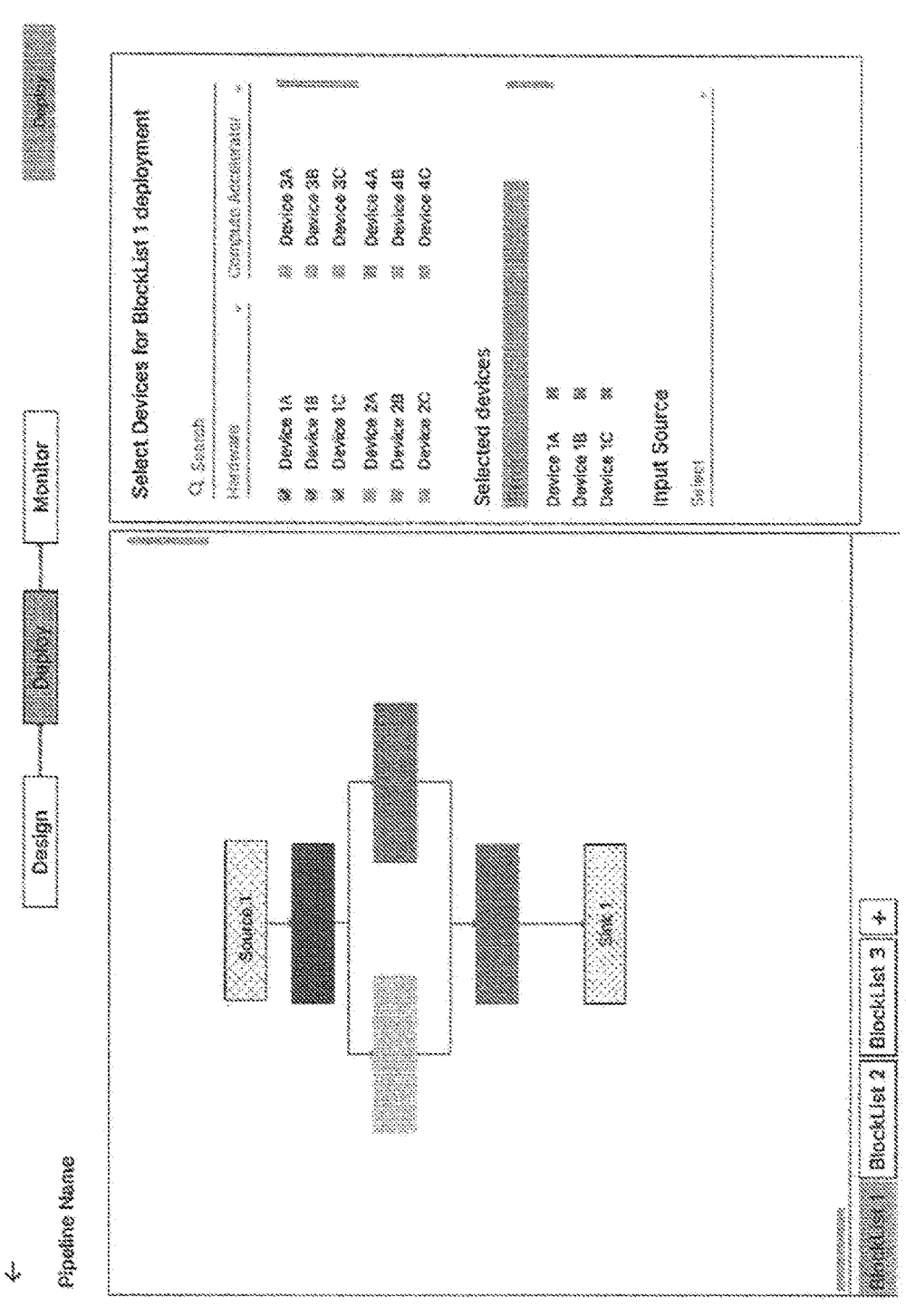
FIG. 14 is a diagram showing a UI of a web page for deploying a configuration file to multiple devices.

FIG. 14 is a diagram showing the UI of a page for deploying the pipeline configuration file across multiple devices.

This screen is displayed by pressing the "SAVE & NEXT" button at the top right of the screen for creating a new pipeline (FIG. 13). At the bottom left of the screen, toggles are displayed to select which one to display from the block lists written in the pipeline. The selected block list will be displayed at the upper left of the screen. Here, it is assumed that "BlockList1" is selected.

The right side of the screen is a field for selecting the devices to which the selected block list (BlockList1 in this case) will be deployed. The pipeline manager inputs the desired conditions, searches for devices that match the conditions, and selects the devices to be deployed from the search results. Here, it is assumed that Devices 1A to 1C are selected. A list of already selected devices is displayed as "Selected Devices." If there is a problem with the detected device type, such as the pipeline not working on that device, an error will pop up.

The input of the pipeline is defined in the "Input Source" column. For example, local video files, live camera outputs, remote camera outputs, etc. may be defined as inputs.

(4-1-3) Debug Pipelines and Get Metrics

Figure 15:
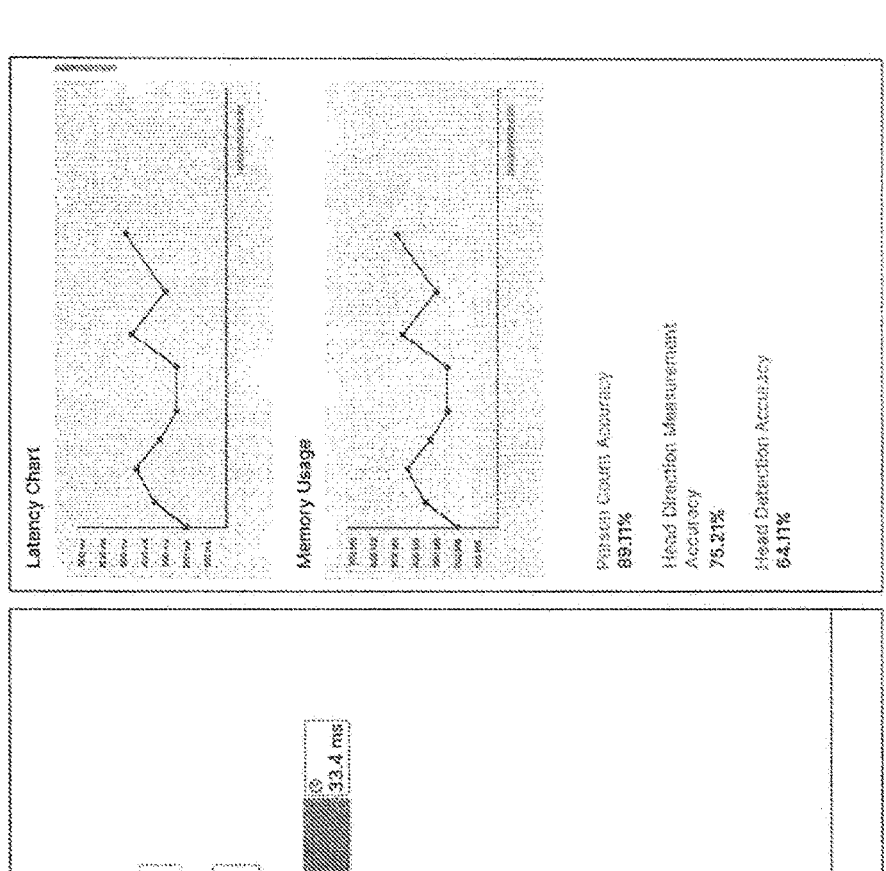
FIG. 15 is a diagram showing a pipeline debug screen.

FIG. 15 is a diagram showing a pipeline debug screen.

This screen is displayed by pressing the "Deploy" button at the top right of the UI screen on the page for deploying the configuration file (FIG. 14).

After deployment of FIG. 14, the profiling results of the inference execution are sent to the centralized server where the data is processed and the results are displayed in the web service, as shown in FIG. 15.

At the bottom left of the screen, toggles are displayed to select which one to display from the block lists written in the pipeline in FIG. 15. The selected block list will be displayed at the upper left of the screen. Here, it is assumed that "BlockList1" is selected.

Delay (latency) information is displayed for each block included in the displayed block list. On the right side of the screen, from top to bottom, the latency of the entire pipeline, the memory usage profile of the entire pipeline execution, the detection results of the accuracy of a particular AI block (for example, the accuracy of person counting, the accuracy of the detection of head direction, the accuracy of head detection) are displayed.

By looking at this, the pipeline manager can grasp the processing speed and memory usage status (performance) of the entire system, and can also determine which block is causing delays. The accuracy of AI judgment can be also checked. Latency in a block may be caused by data not being sent from the previous block or due to slow processing speed of the block itself due to poor hardware. Depending on the cause of the latency, the pipeline manager may change the hardware that runs a particular block from poor to powerful (i.e. change the hardware on which that block is deployed), or change the way blocks are combined, so that it is possible to update the system not so as to cause latency.

Also, if the judgment accuracy of a certain AI block is poor, it can be replaced with a different block, the training data can be updated, or additional learning can be performed. Furthermore, when a new AI block is created by an AI engineer, it is possible to replace the existing block with it, and if there is a hardware update, it is also possible to update the pipeline configuration to correspond to it.

As described above, according to information processing system 1, which is a pipeline processing system of this embodiment, processing of a pipeline in which a plurality of blocks, which are executable programs with an ability to load a trained neural network model for inference processing, are connected, is performed. Information processing system 1 (a pipeline processing system) stores the files of each block that makes up the pipeline, stores pipeline configuration information which is information that defines the pipeline configuration and includes information about all blocks that make up the pipeline and information about the execution order of each block that makes up the pipeline, and loads and executes each of the blocks included in the pipeline using data entered from programs outside the pipeline according to pipeline configuration information and returns the execution result of the pipeline process to the external program. Hence, pipeline processing can be performed efficiently.

In the above explanation, each block takes input as an argument and outputs the calculation result to a specific location (the input of the next block, the server where the result is input, the display device, etc.). The output may be performed as a return value. For example, a block that performs only input or only output (such as a block that outputs a constant value, time, etc. without input) may be created.

Although the present invention is particularly effective when constructing and maintaining a system that uses AI (machine learning, neural networks), the present invention may be applied to systems that do not use AI.

Each block may be an executable file that matches the instruction codes of the CPU, but it may also be a file containing intermediate codes to be executed on a virtual machine (JVM, etc.) on the information terminal like Java bytecode. Furthermore, each block may be a file in which source codes are written, and the source code may be compiled and used on an information terminal, or may be executed on an interpreter in an information terminal.

Deployment can also be done by sending a file from a server to an information terminal (for example, edge devices 200A, 200B) in a state that the pipeline puts blocks together and executing it on the information terminal, or by sending necessary blocks and the configuration file. When pipeline processing is executed across multiple information terminals, the pipeline configuration information sent from the server to the information terminal may be within the range to be executed by this information terminal. That is, the server sends terminal side pipeline configuration information, which includes information about the blocks to be executed in the corresponding information terminal and information about the execution order of these blocks in the created pipeline configuration information (of the entire pipeline) to this information terminal and stores it in the memory or the storage such as a hard disk of this information terminal (the "terminal side configuration information storage circuitry" in the claims). By sending the configuration file to the information terminal, information terminal may access the external server and download necessary files (such as blocks) from the external server.

Based on the performance information obtained in FIG. 15, the server may automatically optimize the pipeline configuration (the arrangement of blocks) by calculation. The configuration files stored in the terminal device may be automatically updated (written) with the optimized configuration file.

As mentioned above, the server sends terminal side pipeline configuration information contains at least information about blocks to be executed in the corresponding information terminal and information about the execution order of these blocks in the created pipeline configuration information (of the entire pipeline) to this information terminal and stores it in the storage of this information terminal. The server receives from each of the above-mentioned information terminals the performance information of the processing of each block instance executed by the corresponding information terminal. The server automatically edits the pipeline configuration information based on these performance information. The server may send at least the terminal side pipeline configuration information (configuration information that includes at least information about blocks to be executed on the corresponding information terminal and information about the order in which these blocks are executed) related to the corresponding information terminal out of this pipeline configuration information, to the corresponding information terminal, and store it in the storage such as a memory and a hard disk in this information terminal.

The SDK source code before compilation is stored on the server side. The compiled SDK source code (library) incorporated into the external application may be downloaded from the server side to each information terminal and stored in each information terminal.

[Other Configuration Examples of the Invention]

The followings may also be considered as configurations of the invention.

(A) a Configuration as a System

A pipeline processing system which executes pipeline processing by combining multiple configuration blocks as a system, wherein the block is an electric file that can be executed by a computer that inputs and outputs data, and the pipeline processing system comprises a server and a device, the server comprising:

a display unit that displays a pipeline configuration by arranging a plurality of icons representing the blocks on a screen;

a changing unit for changing a configuration of the pipeline displayed on the display unit, based on input from a user, a creation unit for creating a configuration file that shows the pipeline configuration based on the pipeline configuration displayed on the display unit;

a selection unit for selecting a device on which the configuration file is to be deployed; and a deployment unit for deploying the configuration file to the device selected by the selection unit, wherein the device comprises:

an acquire unit for acquiring multiple blocks that constitute the pipeline indicated when the configuration file is deployed by the deployment unit; and an execution unit for executing the acquired multiple blocks in sequence according to the configuration file.

This pipeline processing system (information processing system 1) is a pipeline processing system that executes pipeline processing by combining multiple blocks. The server displays the pipeline configuration by arranging multiple icons representing multiple blocks on the screen. The server changes the displayed pipeline configuration based on input from a user. The server creates a configuration file indicating the pipeline configuration based on the displayed pipeline configuration. The server allows to select a device to which the configuration file is deployed, and deploys the configuration file to the selected device. When the configuration file is deployed, the device acquires multiple blocks that constitute the pipeline indicated, and executes the acquired multiple blocks in order according to configuration file. Hence, pipelines can be created easily and efficiently, and a configuration file which indicates the pipeline configuration can be easily deployed.

(B) In addition to the configuration as a system, the invention can also be configured as an invention of only the server part, an invention of only the device part, an invention of a processing method, or a program running on each device.

New and different embodiments can be created by combining or replacing the embodiments described above and the elements (a part of the configuration, a part of the processing) included therein.

The above embodiments should be considered to be illustrative in all respects and not restrictive. The scope of the present invention is indicated by the claims rather than the above description, and it is intended that all changes within the meaning and scope equivalent to the claims are included.

What is claimed is:

1. A pipeline processing system which processes a pipeline connecting multiple blocks that are executable programs with ability to load a trained neural network model for inference processing comprising:

a block file storage circuitry configured to store each block file configuring the pipeline;

a configuration information storage circuitry configured to store pipeline configuration information which is information that defines the pipeline configuration and includes information about all blocks that make up the pipeline and information about an execution order of each block that makes ups the pipeline; and a pipeline processing control circuitry configured to load and execute a trained neural network model for inference processing by executing each of the blocks included in the pipeline using data input from a program outside the pipeline (hereinafter referred to as the "external program") and return an execution result of the pipeline processing to the external program in accordance with the pipeline configuration information, wherein the pipeline processing system includes multiple information terminals, and each of the multiple information terminals comprises a transmission/reception circuitry configured to send output of each block instance executed on own machine via a network to another information terminal that uses output of each block instance as input, and receive output from each block instance on another information terminal via the network as input to each block instance on own machine.

2. The pipeline processing system according to claim 1, wherein the pipeline processing system further comprises a server, the information terminal which executes the external program comprises a terminal side configuration information storage circuitry configured to store terminal side pipeline configuration information which includes at least information about blocks executed on the information terminal and information about an execution order of these blocks in the pipeline configuration information and the server further comprises a user interface circuitry configured to edit the pipeline configuration information and write terminal side pipeline configuration information of this pipeline configuration information into the terminal side configuration information storage circuitry of the information terminal.

3. The pipeline processing system according to claim 2, wherein the server comprises a performance display circuitry configured to receive and display performance information of the processing of each block instance from each of the information terminals.

4. The pipeline processing system according to claim 1, wherein the pipeline processing system further comprises a server, and the server comprises a performance display circuitry configured to receive and display performance information of the processing of each block instance from each of the information terminals.

5. The pipeline processing system according to claim 1, wherein the pipeline processing system further comprises a server, the information terminal which executes the external program comprises a terminal side configuration information storage circuitry configured to store terminal side pipeline configuration information which includes at least information about blocks executed at the information terminal and information about an execution order of these block in the pipeline configuration information, and the server receives performance information of the processing of each block instance from each of the information terminals, the server automatically edits the pipeline configuration information based on the performance information, and the server writes the terminal side pipeline configuration information of the pipeline configuration information to the terminal side configuration information storage circuitry of the information terminal.

6. The pipeline processing system according to claim 1, further comprises a code library storage circuitry configured to store a source code library necessary to execute the blocks included in the pipeline in an execution environment of the external program, and the code is incorporated into the external program.

* * * * *